United States Patent
Mukhopadhyay et al.

(10) Patent No.: US 7,277,441 B1
(45) Date of Patent: Oct. 2, 2007

(54) SYSTEM AND METHOD FOR CREATING AND USING UNIQUE PACKET PREAMBLES FOR DATA COMMUNICATION

(75) Inventors: Snigdhendu S. Mukhopadhyay, San Jose, CA (US); Raja Rangarajan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 994 days.

(21) Appl. No.: 10/396,931

(22) Filed: Mar. 24, 2003

(51) Int. Cl.
*H04L 12/56* (2006.01)
(52) U.S. Cl. .................. 370/395.3; 370/437; 370/447; 370/509; 375/368
(58) Field of Classification Search ............. 370/395.3, 370/335, 352, 343, 447; 708/254; 455/456; 375/368
See application file for complete search history.

(56) References Cited

U.S. PATENT DOCUMENTS

| | | | | |
|---|---|---|---|---|
| 5,258,936 | A * | 11/1993 | Gallup et al. ................ | 708/254 |
| 6,597,675 | B1 * | 7/2003 | Esmailzadeh et al. ....... | 370/335 |
| 7,012,917 | B2 * | 3/2006 | Brolin et al. ................ | 370/352 |
| 2002/0003807 | A1 * | 1/2002 | Amit et al. .................. | 370/447 |
| 2003/0139190 | A1 * | 7/2003 | Steelberg et al. ............ | 455/456 |
| 2003/0206559 | A1 * | 11/2003 | Trachewsky et al. ........ | 370/509 |
| 2004/0179507 | A1 * | 9/2004 | Batra et al. .................. | 370/343 |
| 2005/0195930 | A1 * | 9/2005 | Spital et al. ................. | 375/368 |

OTHER PUBLICATIONS

Koopman, "Maximal Length LFSR Feedback Terms," web page at http://www.ece.cmu.edu/~koopman/lfsr/index.html, 2 pages, printed Mar. 21, 2003.
Ross, "Linear Feedback Shift Registers," web page at http://www.eit.uni-kl.de/baier/Staff/Former_Staff/Clos/further_info/cdma/LFSR.html, 4 pages, printed Mar. 21, 2003.

* cited by examiner

*Primary Examiner*—Chi Pham
*Assistant Examiner*—Albert T. Chou
(74) *Attorney, Agent, or Firm*—Baker Botts L.L.P.

(57) ABSTRACT

Data communication system is provided that comprises a plurality of switches which each comprise a respective controller. Ports on the switch are connected to any one of a multiplicity of far-end devices. Physical media is used to connect each port to a far-end device. Various physical media may be routed through a common binder which can create electromagnetic interference problems. Each port controller is operable to calculate a unique preamble value to be assigned to each port within the switch. The unique preamble value is calculated using a linear feedback shift register function which can be implemented using convenient matrix multiplication operations on seed values stored within the port controllers.

20 Claims, 3 Drawing Sheets

SYSTEM AND METHOD FOR CREATING AND USING UNIQUE PACKET PREAMBLES FOR DATA COMMUNICATION

TECHNICAL FIELD OF THE INVENTION

This invention relates in general to the field of communication systems and, more particularly, to an improved system and method for creating and utilizing unique preambles for data communication packets.

BACKGROUND OF THE INVENTION

Digital data communication environments often involve the placement of communications media in close proximity to one another. As communication systems increase the data rates at which they attempt to communicate, it is often the case that the bandwidth of the signals is increased to accommodate the increased data rate. The increased bandwidth of the communication signals increases the problems associated with electromagnetic cross-talk between communication media placed close to one another. Under certain circumstances an induced signal can be created on a unconnected communication media which will cause a communication system connected to the head-end of the communication media to believe that a transmission is being attempted on the communication link. This condition is referred to as a phantom signal or phantom link. The presence of phantom links can greatly disrupt the overall performance of a digital data communication system and distract resources within the system from the processing of data through actual links.

Digital communication systems often utilize the transmission of data in packets. Typically, each packet may contain a preamble which enables synchronization with the far-end recipient. In conventional systems, the preamble used to identify data packets are predetermined numbers which are stored by the head-end data switch. Typically in conventional systems, the same preamble numbers may be used to identify data packets on parallel communication channels and are therefore not unique to any particular communication session.

SUMMARY OF THE INVENTION

The present invention provides a method and a system for creating and utilizing unique preambles for data communication packets that can be used to prevent phantom data communication links. The use of these unique data communication preambles may substantially eliminate or reduce at least some of the disadvantages and problems associated with previous data communication network management techniques.

In accordance with a particular embodiment of the present invention, a method for creating a unique data communication packet preamble comprises the step of identifying a seed value. The seed value is then subjected to a predetermined number of operations using a linear feedback shift register and a generator value to create a preamble bit field wherein at least one set of bits within the preamble bit field is usable as a unique preamble. The preamble bit field is then sequentially tested against a set of preamble bit criteria until a bit string within the preamble bit field is identified that passes the preamble bit criteria. The resulting bits can then be used as a unique data packet preamble whereby each data communications session conducted will utilize a unique data packet preamble such that the creation of phantom data communication links will be prevented.

Certain embodiments of the present invention will enjoy important technical advantages. For example, according to one embodiment of the present invention, the system can create unique data communication preambles without the need for the various head-end switches which are calculating the preambles to communicate with one another. In addition, according to one embodiment of the present invention, by utilizing unique identifier information for each head-end switch, the system and method of the present invention can guaranty that neighboring switches will efficiently calculate unique data packet preamble numbers which will not be shared by neighboring switches or by neighboring ports within a switch.

BRIEF DESCRIPTION OF THE DRAWINGS

A more complete understanding of the present invention may be acquired by referring to the accompanying figures in which like reference numbers indicate like features and wherein.

DETAILED DESCRIPTION OF THE INVENTION

Figure 1:
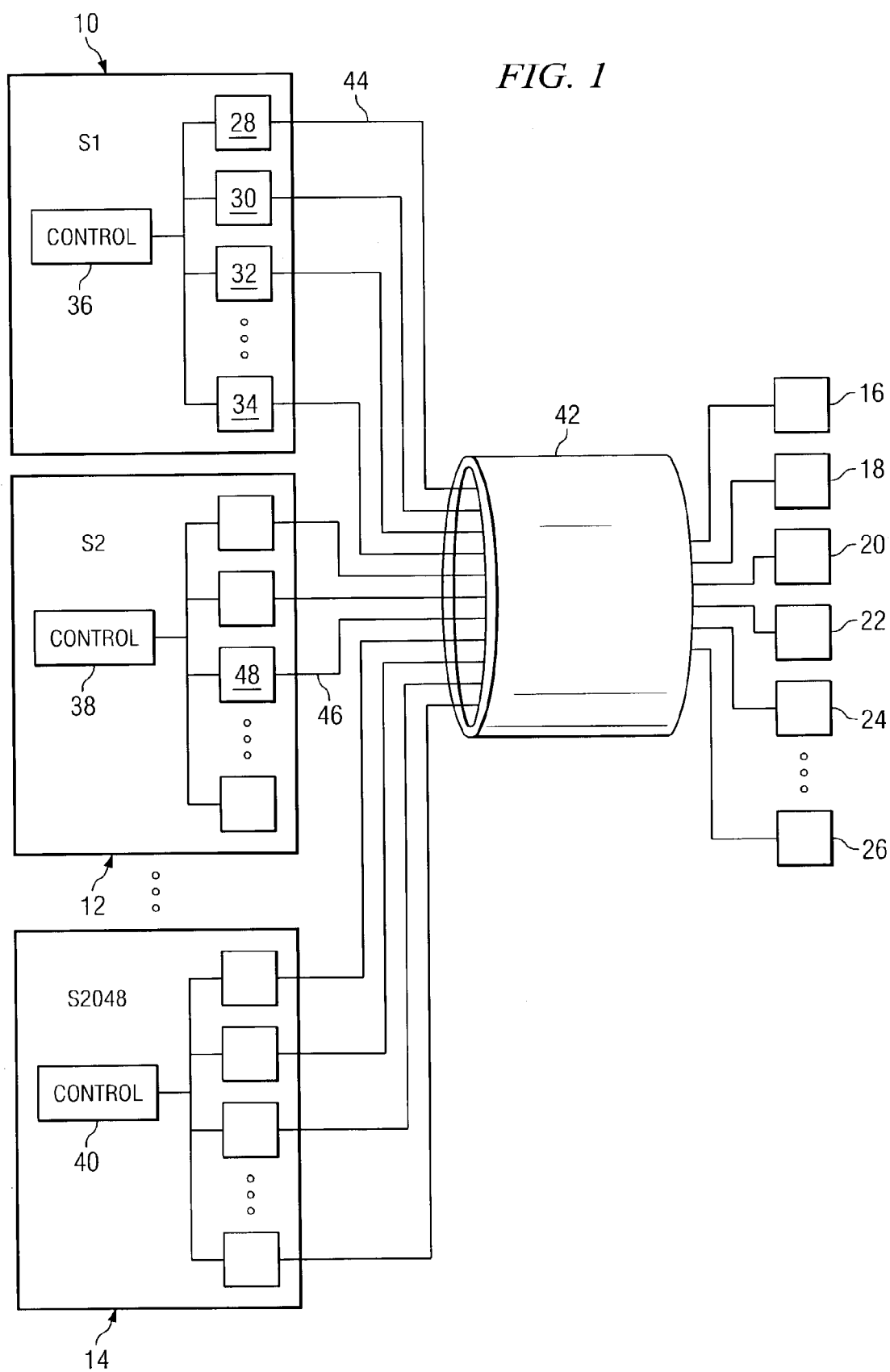
FIG. 1 is a schematic block diagram of a data communication system constructed according to the teachings of the present invention.

FIG. 1 is a schematic lock diagram illustrating the data communication architecture of the present invention. Referring to FIG. 1 a number of head-end switches indicated by exemplary switches 10, 12, and 14 are connected to a multiplicity of far-end data communication devices exemplified by far-end devices 16, 18, 20, 22, 24, and 26. According to the teachings of the present invention, particular embodiments of the system disclosed may accommodate up to the 2,048 separate switches, each comprising up to thirty-two communication ports. For example, switch 10, as shown in FIG. 1, allows independent data communication sessions to exist through data communication ports exemplified by ports 28, 30, 32, and 34 as shown. Similarly, switch 12 can accommodate up to thirty-two independent communication ports and switch 14 can accommodate up to thirty-two independent communication ports. Each of the switches 10, 12, and 14 comprise a port controller 36, 38, and 40, respectively. Port controllers 36, 38, and 40 operate to control the configuration and operation of the various communication ports exemplified by ports 28, 30, 32, and 34 as shown.

It is possible for communication media connecting the switches 10, 12, and 14 to the various far-end devices 16 through 26 to be routed through common binders which hold the communication media in close proximity to one another. This problem is exemplified in FIG. 1 by binder 42 as shown. Because of the signal frequencies common in digital data communication protocols such as ADSL and VDSL, communication media connecting head-end switches to far-end devices that are placed in close proximity to one another can exhibit cross-talk interference due to the electromagnetic coupling which can occur between the conductors within the communication media. For example, the electrical communication media 44 which is connected to port 28 may be very close to the communication media 46 which is connected to port 48 within switch 12 as shown in FIG. 1. Media 44 and 46 may be next to one another within binder 42. In this manner, signals which are traveling on media 44 can cause phantom signals to appear on media 46. These phantom signals on media 46 may be interpreted by port 48 and port controller 38 to be an attempt to communicate with port 48. The resulting processing to respond to and validate the phantom signal which must be conducted by switch 12 and port controller 38 can consume valuable resources. In addition, the cross-talk interference is typically not constant and as such the phantom signal appearing on media 46 and port 48 will turn on and off periodically causing the switch 12 and port controller 38 to repeatedly have to manage the presence of the phantom signals. This condition is referred to as a link "flapping" and can consume valuable resources if not corrected.

Figure 4:
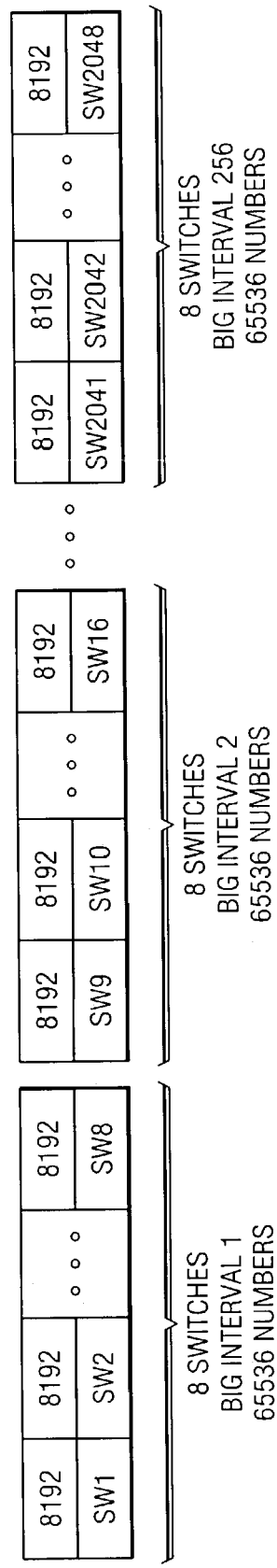
FIG. 4 is a diagram illustrating the preamble ranges and intervals.

Most digital data communication protocols utilize data packets to format the data being communicated from the far-end devices to the head-end ports and vice versa. The communication packets typically include a payload area for the actual data being communicated which is proceeded by a preamble. The preamble is typically a number which functions to ready the receiving device to receive the payload of the information. FIG. 4 illustrates the diversion of the preamble sequences into ranges and the mapping of switch serial numbers into the correct ranges. By way of example and not limitation, in the VDSL standard, the preamble is a 24-bit value. In conventional systems, the preambles used for data communication packets are not unique but are all set to the same value by the switch controllers when a connection at a port is authenticated.

In contrast, according to the teachings of the present invention, a preamble which is mathematically determined to be unique can be used so that each connected port will have its own unique preamble to be used with data packets for that port. In this manner, phantom signals which are caused by electromagnetic interference can be efficiently and quickly dismissed because they will not use the unique data preamble for the particular port. According to one exemplary embodiment of the present invention, a unique preamble can be calculated for each of the thirty-two ports within 2,048 switches. The same techniques may be used for any number of ports and switches. As such, even though ports may reside on different switches they will not, according to the teachings of the present invention, use the same preamble.

The preamble values cannot be chosen by simply finding a different random number for each port. According to the various digital data communications standards, the preambles have additional constraints. For example, according to the standard for VDSL communication, the preamble must be 24-bits in length, must contain exactly twelve ones and exactly twelve zeros, must not contain five consecutive ones and must have either ten, eleven, twelve, thirteen, or fourteen transitions from one to zero or from zero to one. While the advantages of the present invention may be described herein with reference to the preamble characteristics of the VDSL standard, it should be understood that the teachings of the present invention are applicable to any length or formal of preamble in any communication protocol.

According to the teachings of the present invention, it has been determined that a linear feedback shift register can be used with an appropriate generator polynomial to construct a preamble data set which will contain unique preamble bit strings that comply with these constraints and are unique with respect to one another.

Figure 2:
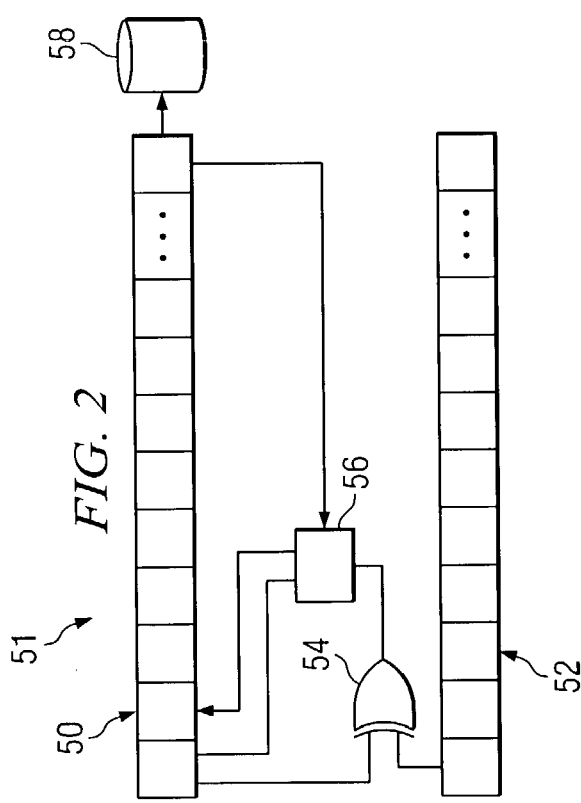
FIG. 2 is a schematic logical diagram of a linear feedback shift register which may be used in the system of the present invention.

FIG. 2 is a schematic diagram which illustrates the operation of a suitable linear feedback shift register 51. FIG. 2 includes a primary shift register 50 which is 24-bits in length. A generator polynomial register 52 is also used in the operation of the linear shift register indicated generally at 51 and FIG. 2. The operation of each bit within the shift register 51 is shown by the exemplary combination of the exclusive OR gate 54 and the multiplexer 56 shown in FIG. 2. Each bit within shift register 50 will be associated with an identical copy of the exclusive OR gate 54 and the multiplexer 56 connected as shown. In operation, the shift register 50 is loaded with a seed value 24-bits in length. The generator polynomial register 52 includes a generator value which may comprise any one of a number of suitable values. For example, one generator polynomial which has been determined to function to generate preambles having the constraints identified herein comprises the hexadecimal value 0x9D8CF5. According to one embodiment of the present invention, the seed value used to begin the calculation process comprises the hexadecimal number 0xF628B2 which is the common factory preset for the preamble for most VDSL communication equipment.

The operation of shift register 51 proceeds by first examining the least significant bit within register 50. If the least significant bit within register 50 is a zero, the shift register 50 merely shifts one place to the right with the least significant bit being fed back into the most significant bit of register 50. The bits generated by register 51 are stored in preamble bit field storage 58 show in FIG. 2. As will be discussed herein, for the exemplary embodiment illustrated herein, the shift register 51 is used to create virtual preamble bit fields 256-bits in length. It has been determined that out of each 256 LFSR operations (which may be thought of as generating a virtual 256-bit preamble bit field), there will be at least one sequence of 24 bits that is useable as a unique preamble in that it will comply with the previously described constraints and it will be different than any other such value in the total output of the shift register 51.

Returning to the operation of register 51, if the least significant bit of register 50 is a one, each bit within the register 50 is exclusive ORed with the corresponding bit within the generator polynomial stored in generator register 52 and the resulting value is input into the next least significant bit within register 50. Once again, the least significant bit is output into the bit storage 58 and is fed back into the most significant bit of register 50. Using the seed value and generator polynomial identified, the shift register 51 can be used to generate a virtual preamble bit field 256-bits in length. It has been determined that within this 256 virtual bit field at least one 24-bit sequence will comply with the constraints required of a preamble. In addition, if the shift register is allowed to continue to operate it can generate up to 65,536 virtual bit fields each associated with 256 potential LFSR operations. Each of these virtual bit fields will contain at least one 24-bit sequence which complies with the constraints and are unique with respect to the other 65,535 groups. Accordingly, by operating the shift register 51 each of 32 ports within up to 2,048 separate switches can be assigned a unique preamble which is mathematically guaranteed to be unique with respect to the remaining 65,535 ports in operation.

The preamble bit field stored within storage 58 only needs to be a virtual bit field in actual operation. In typical operation, the shift register 51 will generate 24-bits of data into storage 58. These 24-bits of data will then be tested against the constraints discussed previously. If the 24-bits of data do not meet the constraints then a single new bit of data will be inserted into bit storage 58 and the first bit of data in bit storage 58 will be discarded. The resulting 24-bits will then once again be tested. Once a 24-bit string has been identified the operation of the shift register 51 can cease and the string can be assigned to a particular port by a controller within the particular switch. In this manner, it will typically require much less than the performance of all 256 LFSR operations to generate a single 24-bit string which meets all of the constraints required of the unique preamble.

In order for all of the preambles to be unique, each of the switches which are calculating the preambles to assign to each of the respective ports must be assigned a particular group of 256-bit values from which to identify their preamble values. This is accomplished by using the last eleven bits of the unique serial number of each of the switches as an offset within the data string. Because these eleven bits are unique to each of the switches, this operation will assign each of the switches a unique portion of the total data set from which to pick unique preamble values. In operation, in accordance with the exemplary embodiment described herein, each port controller such as port controllers 36, 38, and 40 will calculate a unique preamble for each of the thirty-two ports within each of the switches when the switch is first powered up. Each port controller will have access to the serial number of the switch, the generator polynomial, the original seed value, and the computational capability to operate the shift register 51 described previously.

Although it is theoretically possible, it is not optimum for the last port in the last switch to accomplish over 16.5 million shift operations in order to generate the final 24-bit preamble value. According to one embodiment of the present invention, a number of additional values and data sets can be stored at each port controller within the switches in order to expedite the calculation of the preamble values. It is mathematically equivalent to the operation of shift register 51 to perform a matrix multiplication of the seed value by a generator matrix which is constructed as follows:

$$\begin{bmatrix} 0 & 0 & \dots & 0 & 0 & 0 & g23 \\ 1 & 0 & \dots & 0 & 0 & 0 & g22 \\ 0 & 1 & \dots & 0 & 0 & 0 & g21 \\ \dots & \dots & \dots & \dots & \dots & \dots & \dots \\ \dots & \dots & \dots & \dots & \dots & \dots & \dots \\ 0 & 0 & \dots & 1 & 0 & 0 & g2 \\ 0 & 0 & \dots & 0 & 1 & 0 & g1 \\ 0 & 0 & \dots & 0 & 0 & 1 & g0 \end{bmatrix} = \text{Matrix } A \ (24 \times 24)$$

Where g0 through g23 are the individual bits of the 24 bit generator polynomial

If the seed value is multiplied by the generator matrix the resulting 24-bit number is the same as would be contained in shift register 50 following one cycle of operation of shift register 51. In addition, if the resulting 24-bit value is then multiplied by the generator matrix an additional time the resulting value is the same as if the shift register 51 was allowed to pass through two cycles. As a result, the value after two cycles is equal to the original seed value multiplied times the generator matrix multiplied by itself. This mathematical construct can be continued indefinitely so that the resulting 24-bit value after "n" cycles is equal to the original seed value times the original generator matrix to the $n^{th}$ power, where n is a positive integer. These matrix operations can be used to save a great deal of computational time in the generation of the unique preambles for each of the 2,048 switches.

Figure 3:
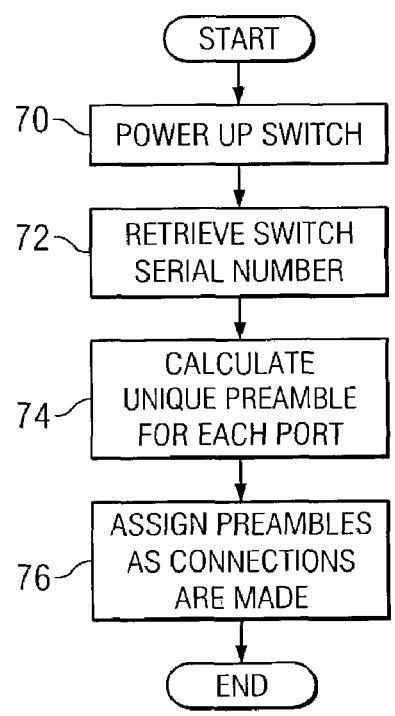

FIG. 3 is a flow diagram which illustrates one embodiment of a method of operating a particular switch. The method begins at step 70 where a particular switch is powered up. The method then proceeds to step 72 where the switch serial number is retrieved from permanent memory within the switch. The method then proceeds to step 74 where the switch serial number and the stored generator polynomial or generator matrix are used by the port controller within the particular switch to calculate unique preambles for each port within the switch. The method then proceeds to step 76 where the port controller assigns the unique preambles to the port as each port requests a connection for a digital data be established. The method then ends.

FIG. 4 illustrates the diversion of the preamble sequences into ranges and the mapping of switch serial numbers into the correct ranges.

The generated LFSR sequences are divided into 256 equal intervals, each intervals with 65,536 numbers. These intervals are called big intervals. For a single switch, assuming we need 32 preambles for 32 ports, we need 32×256=8,192 LFSR sequences. Within a big interval, there are 65,536 LFSR sequences. As such, one big interval has preambles for 8 switches. The total number of switches supported with be 8 times the number of big intervals, or for this embodiment, 2,048. FIG. 4 shows the way the LFSR sequences are divided. Each switch has a unique switch serial number (ssn) that is programmed in its nonvolatile memory during manufacturing. The last 11 bits of this unique ssn is used as an index to determine which preambles this switch will use.

Figure 5:
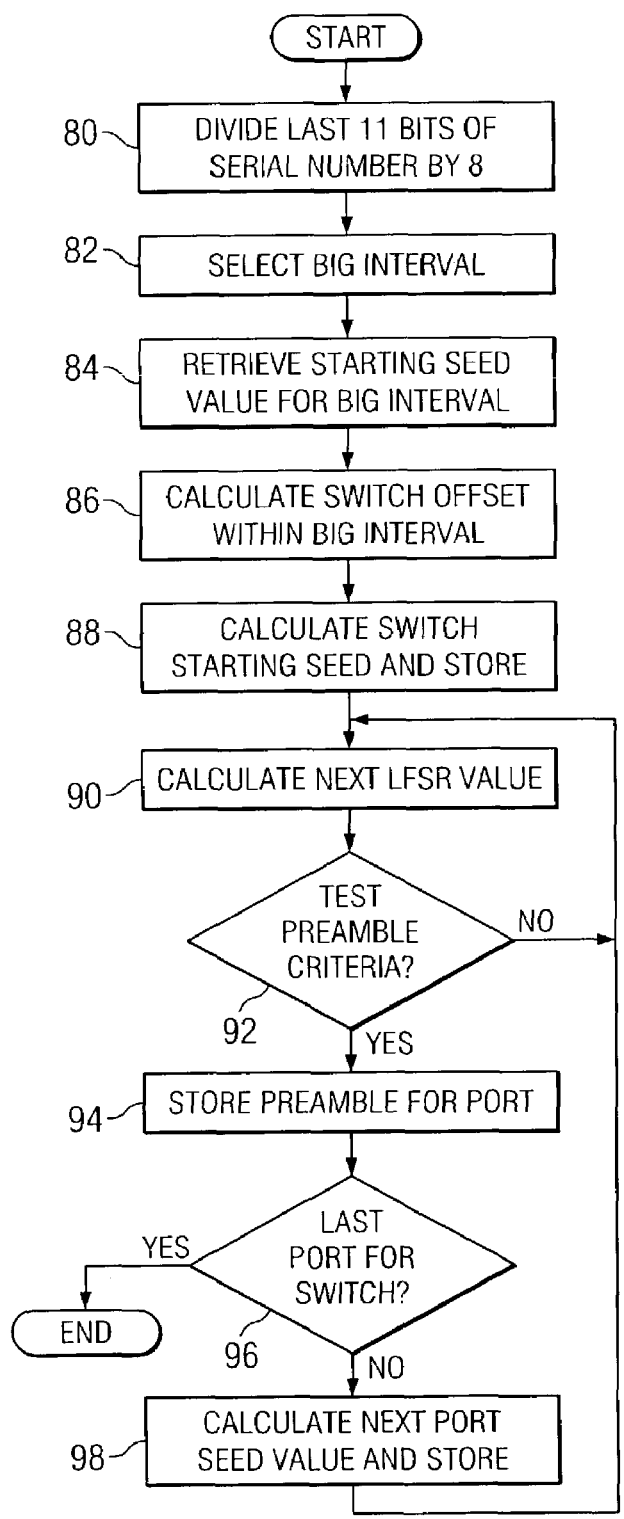
FIGS. 3 and 5 are sequential flow diagrams illustrating one embodiment of the method of creating unique data packet preamble numbers.

FIG. 5 is a flow diagram which illustrates a specific embodiment for calculating unique preambles according to one embodiment of the present invention. The method of FIG. 4 begins at step 80 where the last eleven bits of the serial number associated with a particular switch are divided by eight. The method then proceeds to step 82 where the resulting quotient is used to select a "big interval" within the virtual preamble data field. The virtual preamble data field in its totality comprises enough bits for each of thirty-two ports within 2,048 switches to have 256-bits from which to locate a unique preamble. This entire data field is divided into eight big intervals and prior to the operation of the switches several values and matrices are calculated and stored so that the unique preambles for each port can be efficiently calculated upon power-up of the switch. As discussed previously, the generator matrix can be used to efficiently replicate the operation of the linear feedback shift register. The original generator matrix is thus stored in each port controller. In addition, certain powers of this matrix are also stored. Namely, the matrix to be used at the beginning of each of the big intervals is stored. These comprise the generator matrix to the power of 8,192, 8,192×2, 8,192×3, 8,192×4, 8,192×5, 8,192×6, and 8,192×7. In addition, the generator matrix to the power of 256 is also stored. Also, the original seed value is stored. In addition, 256 seed values evenly placed over the virtual bit field are also stored to provide a shortcut to the operation of the port controller. With these stored values, the port controller is able to skip to the appropriate seed value and use the powers of the generator matrix to quickly find the starting point within the virtual bit field to begin testing for a unique preamble for a particular port.

Referring again to FIG. 5, the method proceeds to step 84 where the starting seed value for the big interval selected in step 82 is retrieved. The method then proceeds to step 86 where a switch offset value is calculated by dividing the last eleven bits of the serial number by eight and using the fraction of the quotient as the offset value. The method then proceeds to step 88 where this offset value is used to identify the starting seed value for the particular switch within the selected big interval. This starting seed value is then stored as it will be used for subsequent ports to find their starting seed values. The starting seed value of the switch being processed is calculated by multiplying the starting seed of the big interval (which is one of the 256 starting seeds stored) by one of the stored generator matrices raised to a particular power. The last eleven bits of the switch serial number can once again be used to select the appropriate power of generator polynomial by dividing the last eleven bits of the switch serial number by eight and using the resulting integer portion of the quotient to select which of the stored generator matrices to use.

Referring again to FIG. 5, the method proceeds to step 90 where the previously described shift and XOR operation are performed to calculate the next LFSR value. Alternatively, this could be accomplished by performing a matrix multiplication of the original generator matrix and the switch starting seed determined in step 88. As discussed, the original generator matrix may be used to progress through the total preamble bit field one bit at a time using matrix operations or the shift and XOR circuit shown in FIG. 2 may be used. In contrast, the stored powers of the original generator matrix are used to skip to a particular point in the preamble bit field, such as the beginning of a big interval or the beginning of a bit set that is associated with a particular switch or port.

The method then proceeds to step 92 where the current 24-bit value resulting from step 90 is tested for the various preamble criteria. Namely as discussed previously, the value must comprise 24-bits that includes exactly twelve ones and exactly twelve zeros. The value must also not contain five consecutive ones and must consecutive ten, eleven, twelve, thirteen, or fourteen transitions. If these criteria are not met, the method returns to step 90 where the appropriate port controller multiplies the current 24-bit value by the original generator matrix to generate an additional 24-bits as a candidate for a preamble. This additional 24-bits is then tested against the preamble criteria in step 92. This loop between steps 90 and 92 continues until the preamble criteria are met wherein the method proceeds to step 94 where the resulting unique preamble is stored by the port controller for use as a preamble for communications through the associated port.

The method proceeds to step 96 where it is determined whether or not the port that has been assigned a preamble was the last port for the particular switch. If it was not the last port for the switch, the method proceeds to step 98 where the next seed value for the next port within the switch is calculated. This calculation involves the matrix multiplication of the starting seed value calculated in step 88 previously multiplied by the original generator matrix to the $256^{th}$ power. The resulting value is then stored so that the next port seed value can be calculated by multiplying the stored value by the generator matrix to the $256^{th}$ power to calculate the next port seed value. The method proceeds from step 98 to step 90 where the stored seed value is used to generate a unique preamble value in steps 90 and 92 as discussed previously. If the port which has been processed by the port controller is the last port for a switch the method passes from step 96 and terminates.

It should be understood that the method shown in FIG. 5 is replicated in each port controller within each of the switches. The use of the unique serial number of each switch as a selection of a big interval within the virtual bit field and as a selection for an offset value within each such big interval insures that even separate switches that have little or no communication with one another will generate unique preambles. As discussed previously with reference to FIG. 1, this is important because the communication media from adjacent switches or from distant switches can still reside next to another within a common binder and cause cross-talk and electromagnetic interference. Using the teachings of the present invention, the communications on the separate communication media will always use uniquely identifiable preambles associated with each data packet. As such, the switches and far-end devices that are communicating over the physical media will be able to identify communications intended for them and differentiate phantom communications which will have different preamble values in the data packets associated with such communications.

Although the present invention has been described in detail it should be understood that various changes, modifications, alterations and substitutions may be made to the teachings described herein without departing from the scope and spirit of the present invention which is solely defined by appended claims.

What is claimed is:

1. A method for communicating data comprising the steps of:
   identifying a particular port within a head-end switch, the port operable to be coupled to a far-end communication device through physical media and to communicate data between the port and the far-end communication device using the physical media;
   generating a unique preamble value to be used as a preamble associated with data packets to be sent from the identified port and to be received by the identified port, the unique preamble value calculated such that other ports within the switch other than the identified port will use different preamble values such that data communications erroneously received by a port that are intended for another port can be differentiated using the unique preamble values assigned to each port, generating the unique preamble value comprising:
      calculating a preamble bit string using a linear feedback shift register function performed on a seed value and using a generator value, the linear feedback shift register function is performed by performing a matrix multiplication operation using a generator matrix associated with the generator value.

2. The method of claim 1 wherein the step of generating is performed by a port controller at the switch.

3. The method of claim 1 wherein the seed value is selected using a unique serial number associated with a particular head-end switch such that neighboring head-end switches can independently calculate preamble values and preamble values calculated by such neighboring switches will be unique as to all switches performing such calculations.

4. The method of claim 1 wherein the generator matrix comprises an original generator matrix and wherein the linear feedback shift register function is performed by performing a matrix multiplication of an offset generator matrix by an original seed value to yield an interval seed value where the offset generator matrix is a power of the original generator matrix.

5. The method of claim 4 wherein the interval seed value is multiplied by the original generator matrix at least once to yield a potential preamble value.

6. The method of claim 4 wherein the interval seed value is multiplied by a power of the original generator matrix to yield a next interval seed value associated with a next port.

7. A method for communicating data comprising:
identifying a particular port within a head-end switch, the port operable to be coupled to a far-end communication device through physical media and to communicate data between the port and the far-end communication device using the physical media;
storing a plurality of seed values and a plurality of generator matrices in a port controller associated with the head-end switch, the plurality of generator matrices each comprising a power of the original generator matrix such that the stored seed values and the stored generator matrices may be used by a switch to calculate preamble values for ports associated with that switch; and
generating a unique preamble value to be used as a preamble associated with data packets to be sent from the identified port and to be received by the identified port, the unique preamble value calculated such that other ports within the switch other than the identified port will use different preamble values such that data communications erroneously received by a port that are intended for another port can be differentiated using the unique preamble values assigned to each port, generating the unique preamble value comprising:
calculating a preamble bit string using a linear feedback shift register function performed on a seed value and using a generator value.

8. A method for communicating data comprising:
identifying a particular port within a head-end switch, the port operable to be coupled to a far-end communication device through physical media and to communicate data between the port and the far-end communication device using the physical media;
generating a unique preamble value to be used as a preamble associated with data packets to be sent from the identified port and to be received by the identified port, the unique preamble value calculated such that other ports within the switch other than the identified port will use different preamble values such that data communications erroneously received by a port that are intended for another port can be differentiated using the unique preamble values assigned to each port, generating the unique preamble value comprising:
calculating a preamble bit string using a linear feedback shift register function performed on a seed value and using a generator value; and
checking the preamble bit string against a set of preamble value criteria before using the preamble bit string as a preamble.

9. The method of claim 8 wherein the preamble value criteria comprise that the preamble must be 24 bits in length.

10. The method of claim 8 wherein the preamble value criteria comprise that the preamble must consist of twelve logical ones and twelve logical zeros.

11. The method of claim 8 wherein the preamble value criteria comprise that the preamble must have either twelve, thirteen, fourteen, or fifteen logical transitions.

12. A data communication switch, comprising:
a plurality of ports operable to identifying a particular port within a head-end switch, the port operable to be coupled to a far-end communication device through physical media and to communicate data between the port and the far-end communication device using the physical media;
a port controller coupled to and controlling at least some of the plurality of ports and operable to:
store a plurality of seed values and a plurality of generator matrices, the plurality of generator matrices each comprising a power of the original generator matrix such that the stored seed values and the stored generator matrices may be used by the port controller to calculate preamble values for ports associated with the port controller; and
generate a unique preamble value to be used as a preamble associated with data packets to be sent from the identified port and to be received by the identified port, the unique preamble value calculated such that other ports within the switch other than the identified port will use different preamble values such that data communications erroneously received by a port that are intended for another port can be differentiated using the unique preamble values assigned to each port.

13. The data communication switch of claim 12 and further comprising a memory for storing a serial number associated with the switch, the port controller operable to access the memory and retrieve at least a portion of the serial number.

14. The data communication switch of claim 12 wherein a seed value is selected using a unique serial number associated with a particular head-end switch such that neighboring head-end switches can independently calculate preamble values and preamble values calculated by such neighboring switches will be unique as to all switches performing such calculations.

15. A data communication switch, comprising:
a plurality of ports operable to identifying a particular port within a head-end switch, the port operable to be coupled to a far-end communication device through physical media and to communicate data between the port and the far-end communication device using the physical media;
a port controller coupled to and controlling at least some of the plurality of ports and operable to generate a unique preamble value to be used as a preamble associated with data packets to be sent from the identified port and to be received by the identified port, the unique preamble value calculated such that other ports within the switch other than the identified port will use different preamble values such that data communications erroneously received by a port that are intended for another port can be differentiated using the unique preamble values assigned to each port, the port controller operable to generate a unique preamble value by calculating a preamble bit string using a linear feedback shift register function performed on a seed value and using a generator value, the linear feedback shift register function performed by performing a matrix multiplication operation using a generator matrix associated with the generator value.

16. A system for communicating data, comprising:
means for identifying a particular port within a head-end switch, the port operable to be coupled to a far-end communication device through physical media and to communicate data between the port and the far-end communication device using the physical media;

means for generating a unique preamble value to be used as a preamble associated with data packets to be sent from the identified port and to be received by the identified port, the unique preamble value calculated such that other ports within the switch other than the identified port will use different preamble values such that data communications erroneously received by a port that are intended for another port can be differentiated using the unique preamble values assigned to each port, the means for generating a unique preamble value comprising:

a means for calculating a preamble bit string using a linear feedback shift register function performed on a seed value and using a generator value, the linear feedback shift register function performed by performing a matrix multiplication operation using a generator matrix associated with the generator value.

17. The system of claim 16 wherein the seed value is selected using a unique serial number associated with a particular head-end switch such that neighboring head-end switches can independently calculate preamble values and preamble values calculated by such neighboring switches will be unique as to all switches performing such calculations.

18. The system of claim 16 wherein the generator matrix comprises an original generator matrix and wherein the linear feedback shift register function is performed by performing a matrix multiplication of an offset generator matrix by an original seed value to yield an interval seed value where the offset generator matrix is a power of the original generator matrix.

19. The system of claim 16 and further comprising means for checking the preamble bit string against a set of preamble value criteria before using the preamble bit string as a preamble.

20. A system for communicating data, comprising:

means for identifying a particular port within a head-end switch, the port operable to be coupled to a far-end communication device through physical media and to communicate data between the port and the far-end communication device using the physical media;

a means for storing a plurality of seed values and a plurality of generator matrices in a port controller associated with a head-end switch, the plurality of generator matrices each comprising a power of the original generator matrix such that the stored seed values and the stored generator matrices may be used by a switch to calculate preamble values for ports associated with that switch; and means for generating a unique preamble value to be used as a preamble associated with data packets to be sent from the identified port and to be received by the identified port, the unique preamble value calculated such that other ports within the switch other than the identified port will use different preamble values such that data communications erroneously received by a port that are intended for another port can be differentiated using the unique preamble values assigned to each port, the means for generating a unique preamble value comprising:

a means for calculating a preamble bit string using a linear feedback shift register function performed on a seed value and using a generator value.

* * * * *